United States Patent

Eaton et al.

Patent Number: 6,085,068
Date of Patent: Jul. 4, 2000

[54] METHOD AND APPARATUS FOR INFORMING A USER OF MESSAGE STATUS IN A COMMUNICATION DEVICE

[75] Inventors: Eric Thomas Eaton, Lake Worth; Von Alan Mock, Boynton Beach, both of Fla.

[73] Assignee: Motorola, Inc., Schaumburg, Ill.

[21] Appl. No.: 08/912,711

[22] Filed: Aug. 18, 1997

Related U.S. Application Data

[63] Continuation of application No. 08/391,735, Feb. 21, 1996, abandoned.

[51] Int. Cl.[7] .............................. H04Q 7/00; H04B 7/00
[52] U.S. Cl. ................. 455/31.3; 455/31.1; 340/825.44
[58] Field of Search ................ 455/31.1, 31.2, 455/31.3, 422, 458, 459, 466, 426; 340/825.44

[56] References Cited

U.S. PATENT DOCUMENTS

| | | | |
|---|---|---|---|
| 5,153,582 | 10/1992 | Davis | 340/825.44 |
| 5,307,399 | 4/1994 | Dai et al. | 379/57 |
| 5,351,235 | 9/1994 | Lahtinen | 370/58.1 |
| 5,596,318 | 1/1997 | Mitchell | 340/825.44 |
| 5,678,179 | 10/1997 | Turcotte et al. | 455/466 |

*Primary Examiner*—Dwayne D. Bost
*Assistant Examiner*—Nay Maung
*Attorney, Agent, or Firm*—James A. Lamb

[57] ABSTRACT

A communication device (125) receives a signal in which messages are included. The communication device (125) includes a decoder (215) for recovering a received message from the signal and a message status element (250) for determining whether the received message is of a first type or a second type of message. Transmission of an acknowledgment by the communication device (125) indicative of a presentation of the received message to a user occurs in response to presentation of a message of the first type, and transmission of an acknowledgment by the communication device indicative of a presentation of the received message to a user does not occur in response to presentation of a message of the second type. The communication device (125) further includes a display (230) for visually presenting information to the user by which the user is alerted to whether the received message is of the first or the second type.

20 Claims, 5 Drawing Sheets

METHOD AND APPARATUS FOR INFORMING A USER OF MESSAGE STATUS IN A COMMUNICATION DEVICE

This is a continuation of application Ser. No. 08/391,735, filed Feb. 21, 1996 and now abandoned.

FIELD OF THE INVENTION

This invention relates in general to message processing in a communication device, and more specifically to a method and an apparatus for informing a user of the status of messages received by the communication device.

BACKGROUND OF THE INVENTION

Conventional communication systems often include communication devices that are used by system users to receive messages. A message transmission device, such as a paging terminal, encodes received information into a radio signal for transmission to a destination communication device, such as a portable transceiver carried by a user. The targeted communication device receives the radio signal and decodes the signal to recover the message information therein. The message information is then stored and displayed to the user. The user can be presented with the message information automatically or in response to user manipulation of controls accessible from the exterior of the communication device.

In one type of prior art communication system, the communication device used by the user for message reception includes a transmitter for transmitting an acknowledge signal back to the message transmission device in response to reception of the message information. In this manner, the message transmission device is notified that the communication device has received the message information. When the acknowledge signal is not received within a predetermined time of message transmission, the message transmission device can retransmit the message to ensure that the communication device receives the message.

In some systems, the communication device can also transmit a "read acknowledge" signal to the message transmission device in response to the presentation of the message by the communication device. Therefore, the message originator can be informed that the user of the communication device has read the message. However, in existing systems that utilize read acknowledge signals, the user of the communication device has no way of determining which messages will result in generation of a read acknowledge signal upon presentation thereof. In such a system, the user of a communication device can be inconvenienced by having to establish communication, such as by telephone or electronic mail, with all message originators of all presented messages if he wants to make sure that all originators know that the messages have been read.

Thus, what is needed is a method and apparatus for informing the user of a communication device of the status of received messages.

SUMMARY OF THE INVENTION

A method for informing a user of message status in a communication device for receiving messages comprises the steps of receiving a signal and recovering a first message from the signal. The communication device determines whether the first message is a first type of message, presentation of which is to result in transmission of an acknowledgment by the communication device. Information is presented about the first message to the user by which the user is informed that the first message is of the first type.

A communication device receives a signal in which messages are included. The communication device includes a decoder for recovering a received message from the signal and a message status element for determining whether the received message is of a first type or a second type of message. Transmission of an acknowledgment by the communication device occurs in response to presentation of a message of the first type, and transmission of an acknowledgment by the communication device does not occur in response to presentation of a message of the second type. The communication device further includes a display for visually presenting information to the user by which the user is alerted to whether the received message is of the first or the second type.

A communication system for providing signal communication comprises a message transmission device for receiving a message and information indicating whether presentation of the message is to result in generation of an acknowledgment. The message transmission device includes circuitry for transmitting the message and a tag indicative of whether the presentation of the message is to result in the generation of the acknowledgment. Further included in the communication system is a communication device for receiving the message and the tag and for determining from the tag whether the presentation of the message is to result in the generation of the acknowledgment. The communication device includes a display for presenting the message and, when the tag indicates that presentation of the message is to result in the generation of the acknowledgment, a predetermined icon alerting the user that the presentation of the message is to result in the generation of the acknowledgment. The communication device further includes a transmission element for generating, when the presentation of the message is to result in the generation of the acknowledgment, the acknowledgment in response to the presentation of the message.

DESCRIPTION OF A PREFERRED EMBODIMENT

Figure 1:
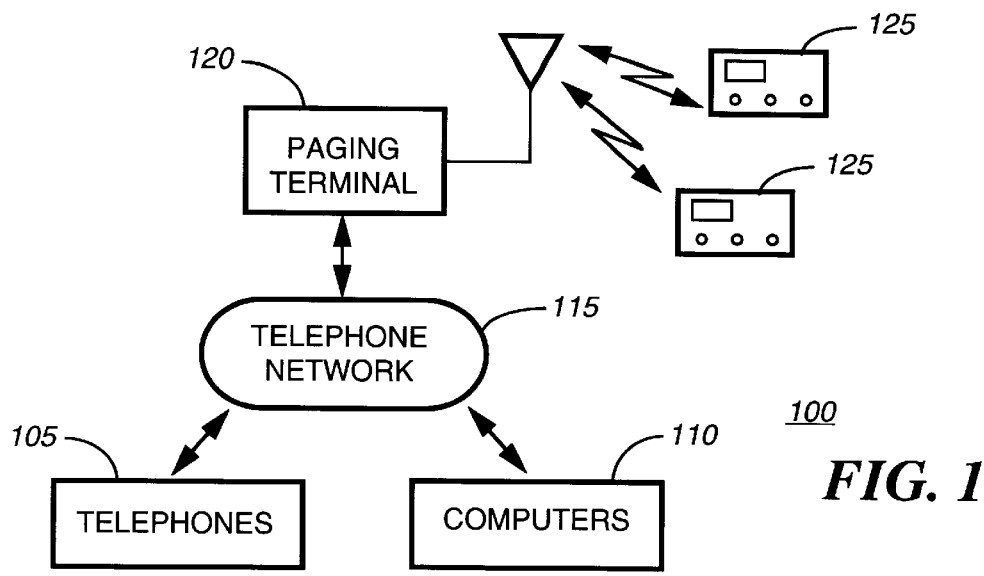
FIG. 1 is a diagram of a communication system in accordance with a preferred embodiment of the present invention.

FIG. 1 is a diagram of a communication system in accordance with a preferred embodiment of the present invention. For example purposes only, the communication system 100 is depicted as a radio communication system comprising a message transmission device, such as a paging terminal 120, for generating and transmitting radio signals. It will be appreciated, however, that the communication system 100 could alternatively comprise other types of communication systems, such as computer networks.

The paging terminal 120 preferably includes an input device (not shown) for receiving messages to be transmitted to one or more communication devices, e.g., portable transceivers 125, included within the communication system 100. Additionally, messages can be received from other message input devices, such as telephones 105 or computers 110 coupled to the paging terminal 120 via a telephone network 115.

According to the present invention, the originator of a message can additionally indicate that the message is to be acknowledged by the recipient transceiver 125 in response to presentation of the message by the transceiver 125. In this manner, the message originator can be conveniently informed when the message has been read by the person to whom the message was sent. By way of example, the terminal 120 could be configured such that a message originator could call into the terminal 120 by telephone to get information about whether the transmitted message has been read yet. Alternatively, an operator at the terminal 120 could call the message originator and notify him or her that the message has been read.

Figure 2:
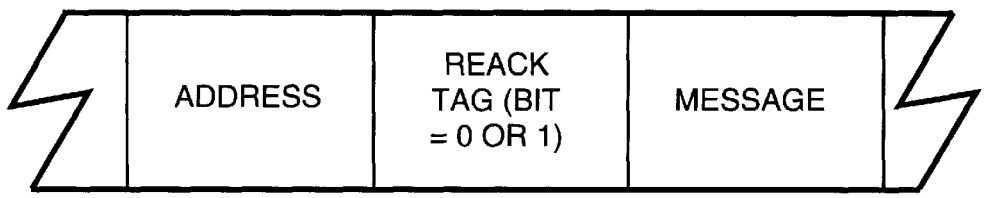
FIG. 2 is a signal diagram of a signal transmitted within the communication system of FIG. 1 in accordance with a preferred embodiment of the present invention.

FIG. 2 is a diagram of a signal, such as a radio signal, transmitted within the communication system 100 by the paging terminal 120.

According to the present invention, a message originator can specify to the paging terminal 120 whether the destination transceiver 125 (FIG. 1) is to send an acknowledge signal back to the terminal 120 in response to the user reading the message. The terminal 120 then collects information including an address indicative of the destination transceiver 125, the message, and, according to the information provided by the originator, a "read acknowledgment" (REACK) tag. For instance, when the portable transceiver 125 is to transmit a REACK, a bit at a predetermined location within the collected information can be set to "one". When, on the other hand, the message originator has not specified that a REACK is to be provided, that bit of the information can be set to "zero". The information collected by the terminal 120 is then encoded into a signalling format, e.g., the POCSAG (Post Office Code Standardization Advisory Group) code or GSC (Golay Sequential Code), and transmitted over the air. The signal transmitted by the paging terminal 120 is received by the portable transceiver 125.

Figure 3:
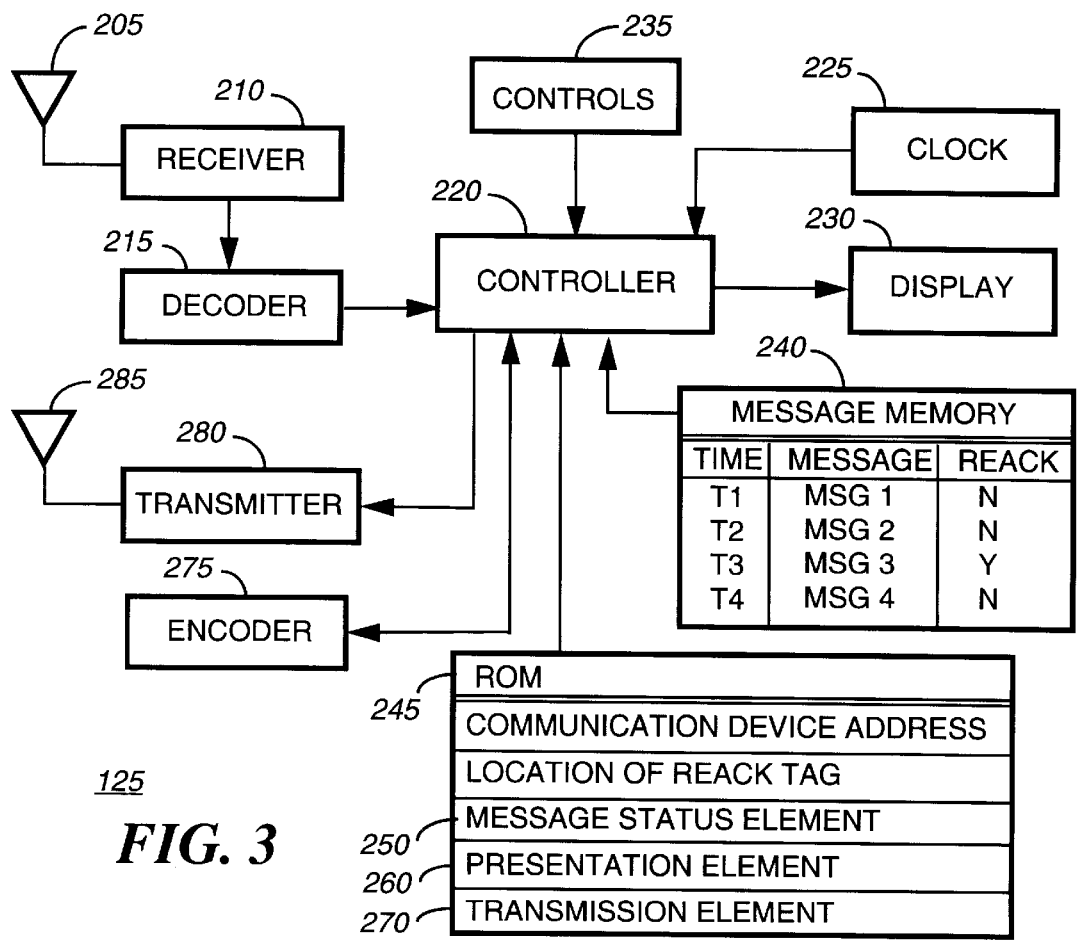
FIG. 3 is an electrical block diagram of a communication device included in the communication system of FIG. 1 in accordance with a preferred embodiment of the present invention.

Referring next to FIG. 3, an electrical block diagram of a communication device, such as a portable transceiver 125, is depicted in accordance with the present invention. The transceiver 125 includes a first antenna 205 for receiving transmitted signals and a receiver 210 coupled thereto for demodulating the signal. A decoder 215 coupled to the receiver 210 decodes the demodulated signal to recover the information included therein. The decoded information is then provided to a controller 220, which controls the operation of the transceiver 125. The transceiver 125 further comprises a clock 225 for generating time values, a display 230 for presenting information to the user in a visual manner, and controls 235 accessible to the user from the exterior of the transceiver 125.

According to the present invention, the transceiver 125 in some instances generates a REACK to indicate that a received message has been read by the user. Therefore, the transceiver 125 also includes an encoder 275 for encoding information into a signalling format such as POCSAG and a transmitter 280 for transmitting the encoded information through use of a second antenna 285.

A message memory 240 included in the transceiver 125 is coupled to the controller 220 for storing messages, reception times for such messages, and indications of whether the transceiver 125 is to transmit a REACK when a particular message is presented to the user. The indication in the memory 240 of whether a REACK is to be transmitted for a given message can be, for example, a flag appended to the message or a bit set within a particular location of the memory. For instance, a bit associated with a memory slot wherein a particular message is stored could be set to equal "one" when a REACK is to be sent for that message and set to equal "zero" when no REACK is to be sent.

The transceiver 125 also includes another memory, such as a read only memory (ROM) 245, for storing firmware and subroutines executed by the controller 220 during operation of the transceiver 125. The ROM 245 preferably includes a communication device address and a location in which a REACK tag within information transmitted to the transceiver 125 can be found. The ROM 245 further includes a message status element 250 for storing received messages in the message memory 240 along with the appropriate REACK indication and for providing message status information to the display 230. A presentation element 260 included in the ROM 245 provides not only stored messages to the display 230, but also iconic indications informing the user that the display of a selected message will result in transmission of a REACK. The ROM 245 also stores a transmission element 270 for generating and controlling transmission of a REACK from the transceiver 125.

Although the message status element 250, presentation element 260, and transmission element 270 are depicted and described as firmware within the ROM 245, it will be appreciated that these elements could be implemented through hardware configured to perform equivalent operations as well. It will also be understood by one of ordinary skill that it would be possible for a single antenna to perform the functions of the first and second antennas 205, 285 through utilization of a switch (not shown) to alternate coupling of the single antenna between the receiver 210 and the transmitter 280.

In accordance with the present invention, each message received by the transceiver 125 is tagged in the memory 240 to indicate whether or not a REACK is to be transmitted back to the terminal 120 (FIG. 1) in response to presentation of the message to the user. The transceiver 125 conveniently presents an icon indicative of which messages will result in transmission of a REACK in response to presentation. Therefore, when the user reads a message marked with a REACK icon, he knows that a REACK will be generated and transmitted back to the paging terminal 120 (FIG. 1). The user then does not need to call or otherwise contact the message originator to let the originator know that he has read the message. Conversely, when the user reads a message that is not marked with a REACK icon, he knows that he must personally contact the originator if he wishes to inform the originator that the message has been read.

Figure 4:
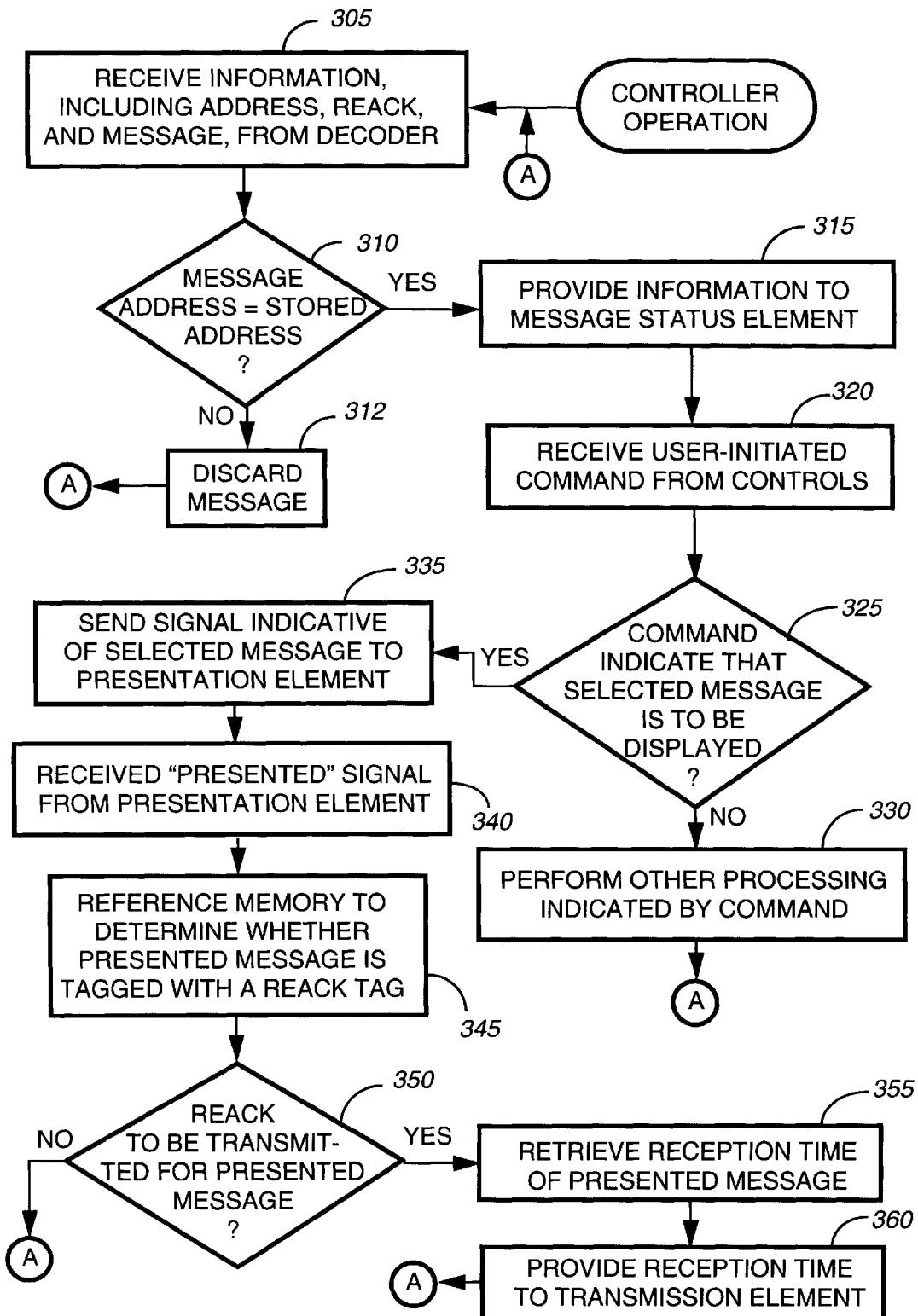
FIG. 4 is a flowchart of the operation of a controller included in the communication device of FIG. 3 in accordance with a preferred embodiment of the present invention.

FIG. 4 is a flowchart depicting the operation of the controller 220. According to the present invention, the controller 220 receives, at step 305, information including an address, a REACK tag, and a message. When, at step 310, the message address is not equivalent to the device address stored in the ROM 245, the message is discarded, at step 312. When, at step 310, the message address is equivalent to the stored address, the information received by the controller 220 is provided, at step 315, to the message status element 250 (FIG. 3).

At step 320, the controller 220 receives a user-initiated command from the controls 235. When, at step 325, the command does not indicate that a message is to be displayed, the controller 220 proceeds to perform other processing, at step 330. When, at step 325, the command from the controls 235 indicates that a message is to be displayed, the controller 220 sends, at step 335, a signal indicative of the selected message to the presentation element 260.

In response to reception of a "presented" signal, at step 340, indicating that the selected message has been displayed, the controller 220, at step 345, references the message memory 240 to determine whether the presented message is tagged with a REACK tag indicating that a REACK should be transmitted to acknowledge that the message has been read by the user. When, at step 350, a REACK tag indicates that a REACK should be transmitted, the controller 220 retrieves the reception time of the message from the message memory 240, at step 355. Thereafter, the reception time is provided, at step 360, to the transmission element 270.

Figure 5:
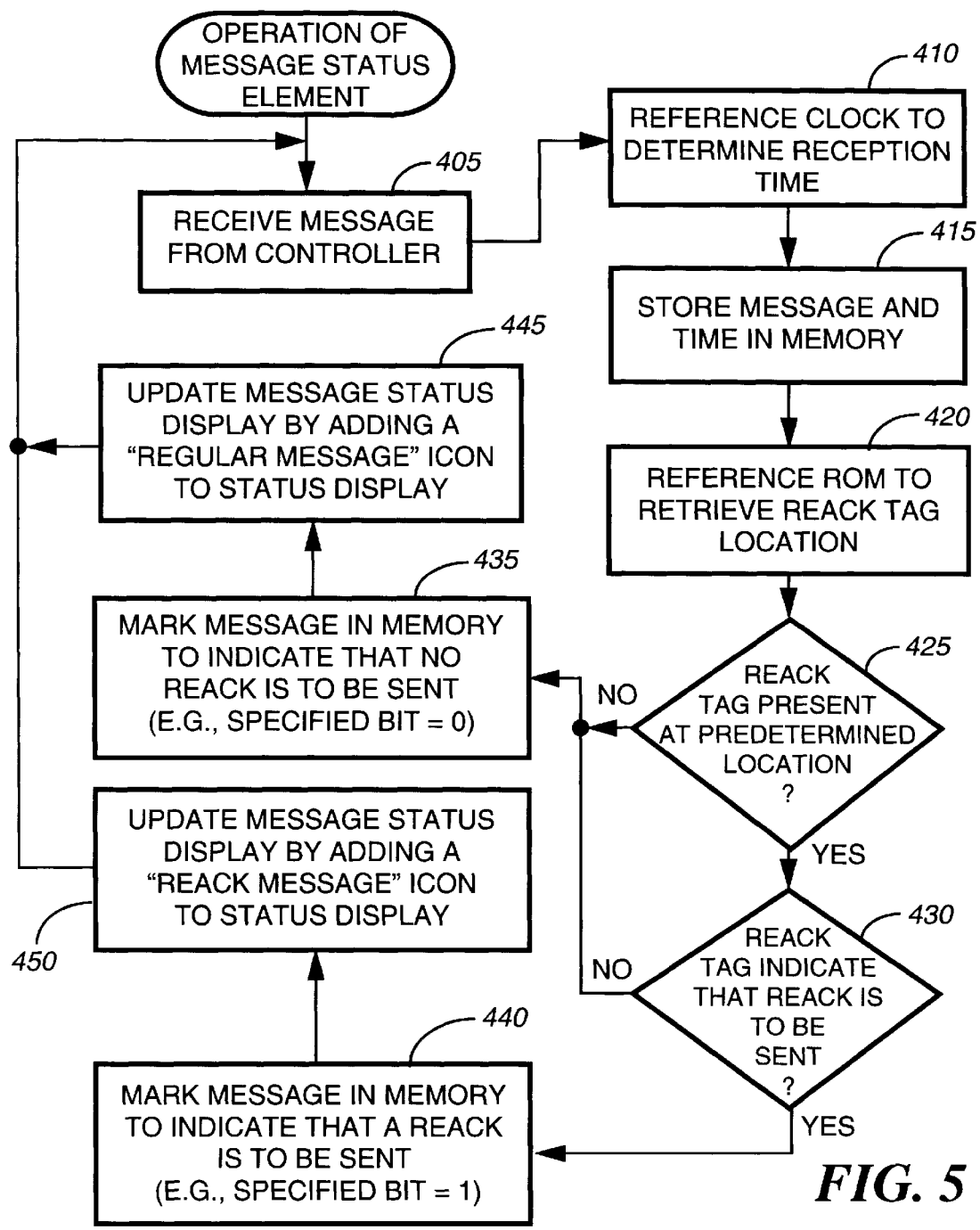
FIG. 5 is a flowchart of the operation of a message status element included in the communication device of FIG. 3 in accordance with a preferred embodiment of the present invention.

Referring next to FIG. 5, a flowchart illustrates the operation of the message status element 250 (FIG. 3) according to the present invention. At step 405, information, including at least a REACK tag and a message, is received from the controller 220, subsequent to which the clock 225 is referenced, at step 410, to retrieve a time value indicative of reception time of the message. At step 415, the message included in the information and the reception time are stored in the message memory 240.

Thereafter, the ROM 245 is referenced, at step 420, to retrieve the predetermined location of the REACK tag. When, at step 425, the REACK tag is present at the predetermined location, the message status element 250 further determines, at step 430, whether the REACK tag indicates that presentation of the message is to result in transmission of a REACK. When there is no REACK tag present in the message or when the REACK tag indicates that no REACK is to be sent, the message is marked, at step 435, in the message memory 240 to indicate that presentation of the message should not result in transmission of a REACK. The message can be marked, for instance, by setting a memory bit to "zero" or another predetermined value. On the other hand, when the REACK tag indicates that a REACK is to be transmitted, the message, at step 440, is marked, such as by setting a memory bit to "one", to indicate that message presentation should cause transmission of a REACK.

Figure 6:
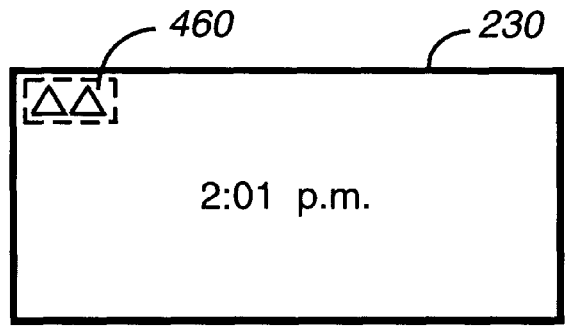
FIG. 6 depicts the display of message status information by the communication device of FIG. 3 in accordance with a preferred embodiment of the present invention.

Subsequently, the message status element 250 updates a message status display, as may be better understood with reference to FIGS. 6 and 7. FIG. 6 is an illustration of the presentation of message status information 460 in the upper left-hand corner of the transceiver display 230. As shown in FIG. 6, the message status information 460, e.g., the message status display, indicates to the user that two messages are currently stored in the message memory 240. Each message stored in the memory 240 is represented by a "regular message" icon, e.g., a triangular icon, to inform the user that the messages are "regular" messages, the presentation of which will not result in transmission of a REACK. Therefore, the user is alerted to the fact that, if he wishes the originator to know that he has read one of the regular messages, he must contact the originator.

Figure 7:
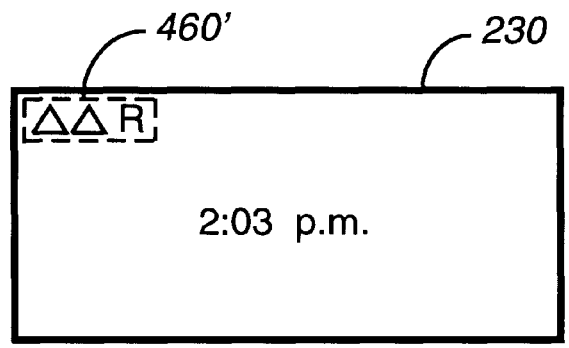
FIG. 7 is an illustration showing the display of message status information by the communication device of FIG. 3 in response to reception of a message requiring a read acknowledge signal in accordance with a preferred embodiment of the present invention.

FIG. 7 depicts the presentation of the message status display 460' after reception of a "REACK message" that will result in a REACK after presentation. In the upper left-hand corner of the display 230, an additional icon has been added to the message status display 460' to inform the user of reception of another message. This icon, however, is shaped differently than those representative of regular messages. By way of example only, the distinct "acknowledgment" icon representative of the received REACK message is displayed as the letter "R". Other icons could alternatively be presented to indicate that a REACK message has been received.

Returning to FIG. 5, the message status element 250 updates, at step 445, the message status display by adding a regular message icon to the status display when a regular message has been received. When, on the other hand, a REACK message has been received, a REACK message icon is added to the message status display, at step 450.

Figure 9:
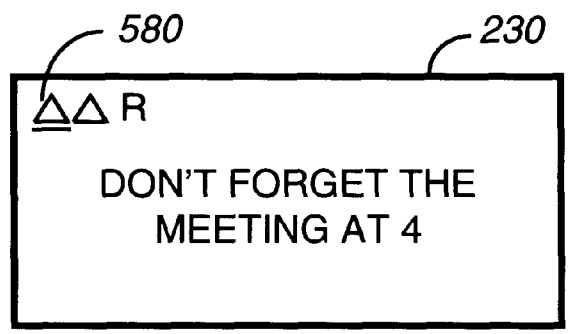
FIG. 9 is an illustration showing the presentation of a message that does not result in the transmission of a read acknowledge signal by the communication device of FIG. 3 in accordance with a preferred embodiment of the present invention.
Figure 8:
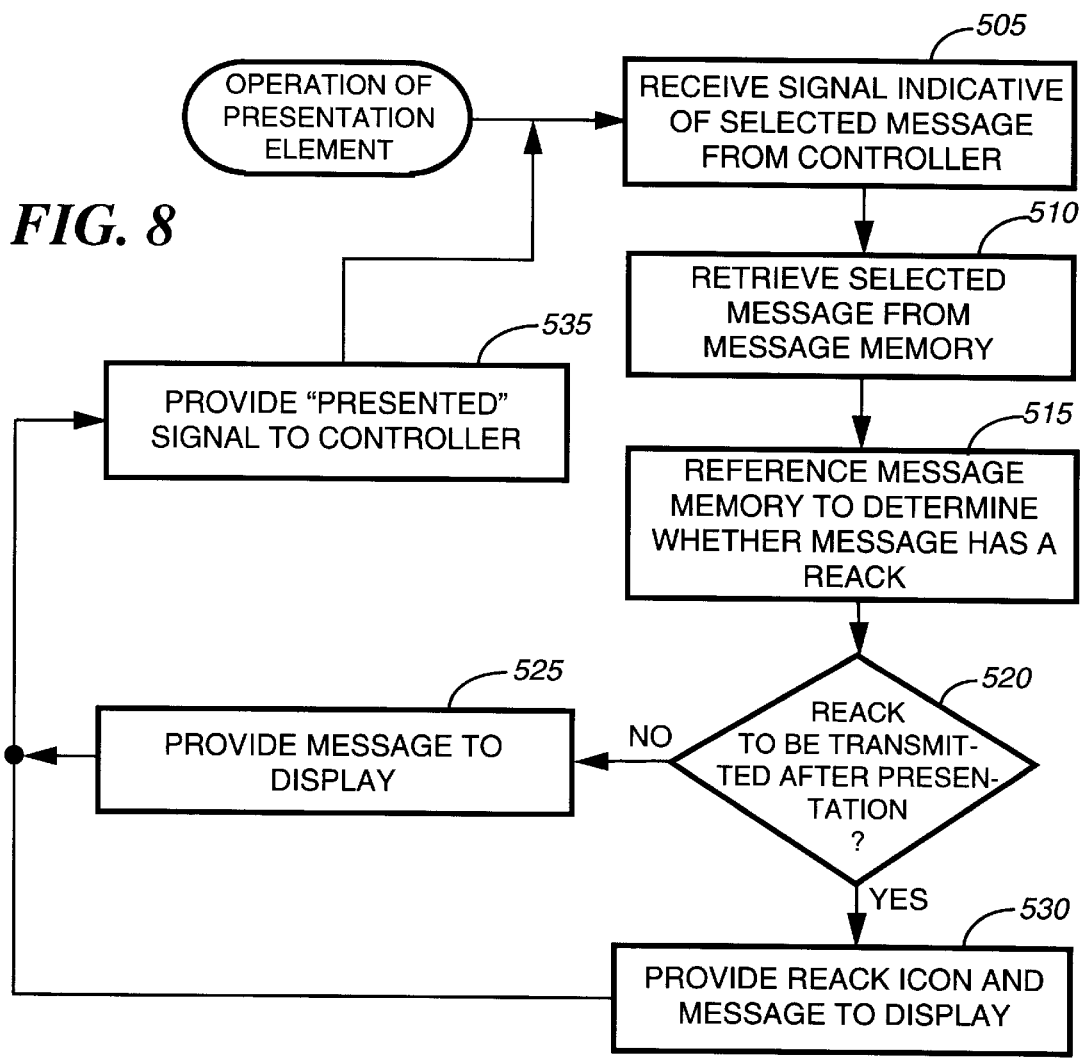
FIG. 8 is a flowchart of the operation of a presentation element included in the communication device of FIG. 3 in accordance with a preferred embodiment of the present invention.

FIG. 8 is a flowchart depicting the operation of the presentation element 260 (FIG. 3). According to the present invention, at step 505, a signal indicative of a selected message is received from the controller 220, subsequent to which the selected message is retrieved, at step 510, from the message memory 240. The message memory 240 is then referenced, at step 515, to determine whether the message is tagged with a REACK tag indicating that a REACK is to be sent. When, at step 520, the message is a regular message for which a REACK is not to be sent, the message is provided to the display 230, at step 525. The display of a regular message may be better understood by referring to FIG. 9. In FIG. 9, the regular message is presented on the display 230. Additionally, the icon 580 representative of the regular message has been marked, such as by underlining, to inform the user which message is being displayed.

Figure 10:
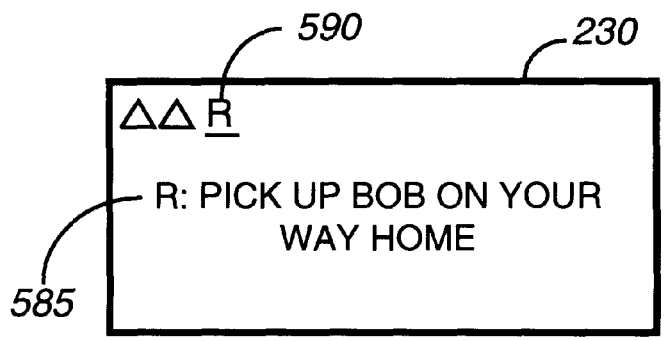
FIG. 10 depicts the presentation of a message that results in the transmission of a read acknowledgment signal by the communication device of FIG. 3 in accordance with a preferred embodiment of the present invention.

Returning to FIG. 8, when, at step 520, the message selected for display is a REACK message, the message along with another "acknowledgment" icon, e.g., a REACK icon, is provided, at step 530, to the display 230, as may be better understood by reference to FIG. 10. FIG. 10 is an illustration of the display 230 when presenting a REACK message to the user. When a REACK message is presented, the predetermined REACK icon 585 is also presented on the display 230 to alert the user to the fact that a REACK transmission will result from display of the message. Additionally, the icon 590 representative of the REACK message in the message status display can be underlined to indicate to the user which message is currently being presented. Although the two icons 585, 590 indicative of the REACK message are depicted in FIG. 10 as being shaped the same, i.e., as the letter "R", it will be appreciated that the two icons could be different from each other and formed in shapes different than the letter "R".

Returning to FIG. 8, the presentation element 260 provides, at step 535, a "presented" signal to the controller 220 after presentation of the selected message on the display 230.

Figure 11:
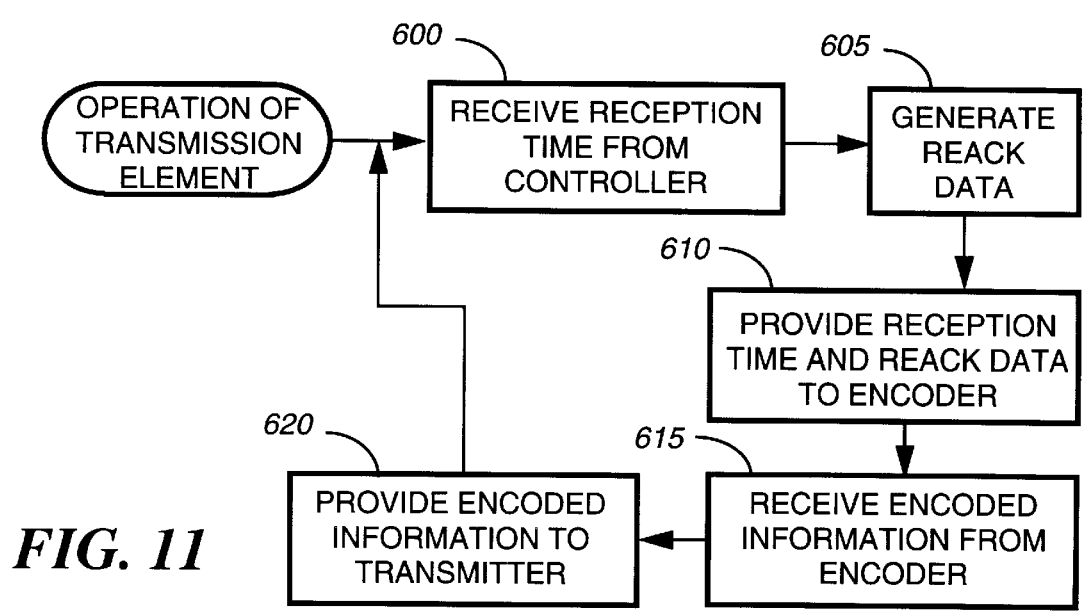
FIG. 11 is a flowchart depicting the operation of a transmission element included in the communication device of FIG. 3 in accordance with a preferred embodiment of the present invention.

FIG. 11 is a flowchart of the operation of the transmission element 270 included in the transceiver 125. At step 600, the transmission element 270 receives the reception time from the controller 220, after which REACK data is generated, at step 605. The REACK data preferably comprises predetermined data understood by the paging terminal 120 (FIG. 1) to indicate that a REACK message has been presented by the transceiver 125. The reception time and the REACK data are then, at step 610, provided to the encoder 275 for encoding into a signalling format such as POCSAG. The reception time is preferably utilized to identify the message that has been presented to the terminal 120. It will be understood, however, that other methods of identifying the message to the terminal 120 could also be utilized. When, at step 615, the encoded information is received by the transmission element 270, it is provided to the transmitter 280, at step 620, for transmission as a REACK. Thereafter, the terminal 120 receives the REACK and can inform the originator that the message has been read.

In summary, the communication device as described above receives a message that is marked to indicate whether the device is to transmit an acknowledgment back to the terminal after the message has been read. In other words, the message is marked to indicate whether the device is to transmit a read acknowledgment (REACK) upon presentation of the message. When presentation of the message is not to result in a REACK, the message is displayed to the user in a conventional fashion and a message status display indicates to the user that a regular message has been received. Conversely, when presentation of the message is to result in a REACK, the message status display includes a distinctive icon representative of the REACK message. When the user chooses to have the REACK message presented, a REACK icon is displayed along with the message to again alert the user that a REACK will be transmitted to the terminal.

In this manner, the user is advantageously informed of which messages will be acknowledged once they have been presented. Additionally, upon display of a REACK message, the user is alerted that a REACK will be transmitted. Therefore, the user need not waste time attempting to contact the originator of a REACK message to inform him that the message has been read. At the same time, the lack of a REACK icon during the display of a regular message conveniently informs the user that no REACK will be transmitted. As a result, the user knows that he must personally contact the originator if the originator is to be informed that the user has read the message.

It will be appreciated by now that there has been provided a method and apparatus for informing a user of which received messages will result in transmission of a read acknowledgment signal in response to presentation.

What is claimed is:

1. A method for informing a user of message status in a communication device for receiving messages, the method comprising the steps of:

receiving a signal;

recovering a first message from the signal;

determining whether the first message is a first type of message, presentation of which to the user initiates transmission of an acknowledgment by the communication device wherein the acknowledgment indicates that the first message has been presented to the user; and presenting information about the first message to the user by which information is presented user is informed that the first message is of the first type, wherein the information is presented prior to presenting the first message itself.

2. The method of claim 1, wherein the determining step comprises the step of:

locating information associated with the first message within the signal, the information indicating that presentation of the first message is to result in transmission of the acknowledgment by the communication device.

3. The method of claim 1, wherein:

the first type of message includes messages that result in transmission of acknowledgments by the communication device in response to presentation thereof that indicate that the first messages have been presented to the user;

a second type of message includes messages that do not result in transmission of acknowledgments by the communication device in response to presentation thereof that indicate that the second messages have been presented to the user; and the determining step comprises the step of:

determining whether the first message is of the first type or of the second type based upon information associated with the first message in the signal.

4. The method of claim 3, wherein the presenting step comprises the step of:

displaying message status information including icons representative of the messages received by the communication device, wherein a first acknowledgment icon represents the first message, wherein the first acknowledgment icon is distinct from other icons representative of messages of the second type, and wherein presentation of the icons does not require presentation of the messages themselves.

5. The method of claim 4, further comprising the steps of:

presenting the first message; and transmitting, in response to presenting the first message, the acknowledgment indicating that the first message has been presented to the user.

6. The method of claim 5, further comprising, substantially coincident with the step of presenting the first message, the step of:

displaying a second acknowledgment icon along with the first message.

7. The method of claim 5, further comprising the steps of:

receiving a second message;

determining that the second message is of the second type; and presenting the second message without displaying an acknowledgment icon along with the second message and without transmitting an acknowledgment from the communication device in response to presentation of the second message indicating that the second message has been presented to the user.

8. A communication device for receiving a signal in which messages are included, the communication device comprising:

a decoder for recovering a received message from the signal;

a message status element for determining whether the received message is of a first type or a second type of message, wherein transmission of an acknowledgment by the communication device occurs in response to presentation of a message of the first type to the user and without intervention of the user other than that required for presentation of the message of the first type, wherein the acknowledgment indicates that the received message has been presented to the user, and wherein transmission of the acknowledgment by the communication device does not occur in response to presentation of a message of the second type; and a display for visually presenting information to the user of the communication device by which the user is alerted to whether the deceived message is of the first or the second type, wherein presentation of the information precedes presentation of the received message itself.

9. The communication device of claim 8, wherein the information presented to the user comprises message status information that includes icons representative of the messages received by the communication device in the signal but distinct from the messages themselves.

10. The communication device of claim 9, wherein the message status information includes a first icon for each message of the first type received by the communication device and includes a second icon for each message of the second type received by the communication device.

11. The communication device of claim 8, further comprising a memory for storing the received message and an indication of whether the received message is of the first or the second type.

12. The communication device of claim 8, further comprising a transmitter for transmitting the acknowledgment in response to the presentation of the received message when the received message is determined to be of the first type by the message status element.

13. The communication device of claim 12, further comprising a presentation element for providing, when the received message is of the second type, the received message and a predetermined icon to the display, wherein the predetermined icon indicates that the received message is of the second type.

14. The communication device of claim 12, further comprising a presentation element for providing, when the received message is of the first type, the received message and a predetermined icon to the display, wherein the predetermined icon indicates that the received message is of the first type.

15. The communication device of claim 14, further comprising a memory for storing the message status element and the presentation element.

16. A communication system for providing signal communication, the communication system comprising:

a message transmission device for receiving a message and information indicating whether presentation of the message is to result in generation of an acknowledgment without user intervention other than that required for presentation of the message, the message transmission device comprising means for transmitting the message and a tag indicative of whether the presentation of the message to the user is to result in the generation of the acknowledgment indicative of the presentation; and a communication device for receiving the message and the tag and for determining from the tag whether the presentation of the message to the user is to result in the generation of the acknowledgment indicative of the presentation of the message, the communication device comprising:

a display for presenting, when the tag indicates that presentation of the message is to result in the generation of the acknowledgment, a predetermined icon alerting a user of the communication device that the presentation of the message is to result in the generation of the acknowledgment, wherein the predetermined icon is distinct from the message itself; and a transmission element for generating, when the presentation of the message is to result in the generation of the acknowledgment, the acknowledgment in response to the presentation of the message.

17. The communication system of claim 16, wherein the display presents the predetermined icon prior to the presentation of the message, wherein the predetermined icon is distinct from other icons presented on the display.

18. The communication system of claim 16, wherein the display presents the predetermined icon substantially coincident with the presentation of the message, wherein the predetermined icon is distinct from other icons presented on the display.

19. The communication system of claim 16, wherein the communication device is a portable transceiver.

20. The communication system of claim 16, wherein the tag is of a first value when the presentation of the message is to result in the generation of the acknowledgment, and wherein the tag is of a second value when the presentation of the message is not to result in the generation of the acknowledgment.

* * * * *